US009361752B2

(12) United States Patent
Dumont et al.

(10) Patent No.: US 9,361,752 B2
(45) Date of Patent: Jun. 7, 2016

(54) MOBILE DEVICE GAMING IMPROVEMENTS

(75) Inventors: Jon-Paul Emile Dumont, San Francisco, CA (US); Siavash Ghamaty, San Francisco, CA (US); Laura Dansingani, San Carlos, CA (US); Live Zhang, San Francisco, CA (US); Genki Mine, San Mateo, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/492,731

(22) Filed: Jun. 8, 2012

(65) Prior Publication Data

US 2012/0315993 A1 Dec. 13, 2012

Related U.S. Application Data

(60) Provisional application No. 61/495,361, filed on Jun. 9, 2011.

(51) Int. Cl.
*A63F 9/24* (2006.01)
*G07F 17/32* (2006.01)

(52) U.S. Cl.
CPC .................................. *G07F 17/3225* (2013.01)

(58) Field of Classification Search
USPC .......................................... 463/30, 37, 40, 42
See application file for complete search history.

(56) References Cited

U.S. PATENT DOCUMENTS

| 6,666,768 | B1 | 12/2003 | Akers |
| 8,167,695 | B2 | 5/2012 | Rowe |

| 2005/0233794 | A1* | 10/2005 | Cannon et al. ................. 463/16 |
| 2007/0129149 | A1 | 6/2007 | Walker et al. |
| 2008/0064502 | A1 | 3/2008 | Schlottmann et al. |
| 2008/0146342 | A1 | 6/2008 | Harvey et al. |
| 2008/0254885 | A1 | 10/2008 | Kelly |

(Continued)

FOREIGN PATENT DOCUMENTS

WO WO-2012170959 A1 12/2012

OTHER PUBLICATIONS

"International Application Serial No. PCT/US2012/041763, International Search Report mailed Aug. 1, 2012", 3 pgs.

(Continued)

*Primary Examiner* — Paul A D'Agostino
*Assistant Examiner* — Brandon Gray
(74) *Attorney, Agent, or Firm* — Schwegman Lundberg & Woesner, P.A.

(57) ABSTRACT

Disclosed in some examples is a method of providing a computer implemented game comprising: displaying one or more on-screen objects in accordance with the computer implemented game; accepting input from a user of the computer implemented game; responsive to receiving input from the user, updating the one or more on-screen objects according to one or more game rules using one or more computer processors; receiving a notification from a game server, over a network, that the user of the computer implemented game has completed a gameplay specific task in a second computer implemented game, wherein the second computer implemented game is provided on a separate platform from the computer implemented game; and responsive to receiving the notification from the game server, providing a reward to the user in the computer implemented game.

25 Claims, 16 Drawing Sheets

(56) References Cited

U.S. PATENT DOCUMENTS

| | | | |
|---|---|---|---|
| 2009/0117970 A1* | 5/2009 | De Waal et al. | 463/20 |
| 2009/0280904 A1* | 11/2009 | Nicely et al. | 463/40 |
| 2010/0113148 A1* | 5/2010 | Haltovsky et al. | 463/30 |
| 2010/0178986 A1* | 7/2010 | Davis et al. | 463/42 |
| 2010/0311497 A1* | 12/2010 | Suslik | 463/25 |
| 2010/0317442 A1 | 12/2010 | Thomas et al. | |
| 2011/0275438 A9* | 11/2011 | Hardy et al. | 463/42 |

OTHER PUBLICATIONS

"International Application Serial No. PCT/US2012/041763, Written Opinion mailed Aug. 1, 2012", 3 pgs.

"International Application Serial No. PCT/US2012/041763, International Preliminary Report on Patentability mailed Dec. 27, 2013", 5 pgs.

\* cited by examiner

MOBILE DEVICE GAMING IMPROVEMENTS

CLAIM OF PRIORITY

This patent application claims the benefit of priority to U.S. Provisional Patent Application Ser. No. 61/495,361, entitled "Mobile Device Gaming improvements," filed on Jun. 9, 2011, which is incorporated by reference herein in its entirety.

TECHNICAL FIELD

The present disclosure generally relates to games and applications in general and, in particular embodiments, to computer-implemented, social games operating on mobile or portable computing devices.

BRIEF DESCRIPTION OF THE DRAWINGS

Some embodiments are illustrated by way of example and not imitation in the figures of the accompanying drawings.

DETAILED DESCRIPTION

Figure 1:
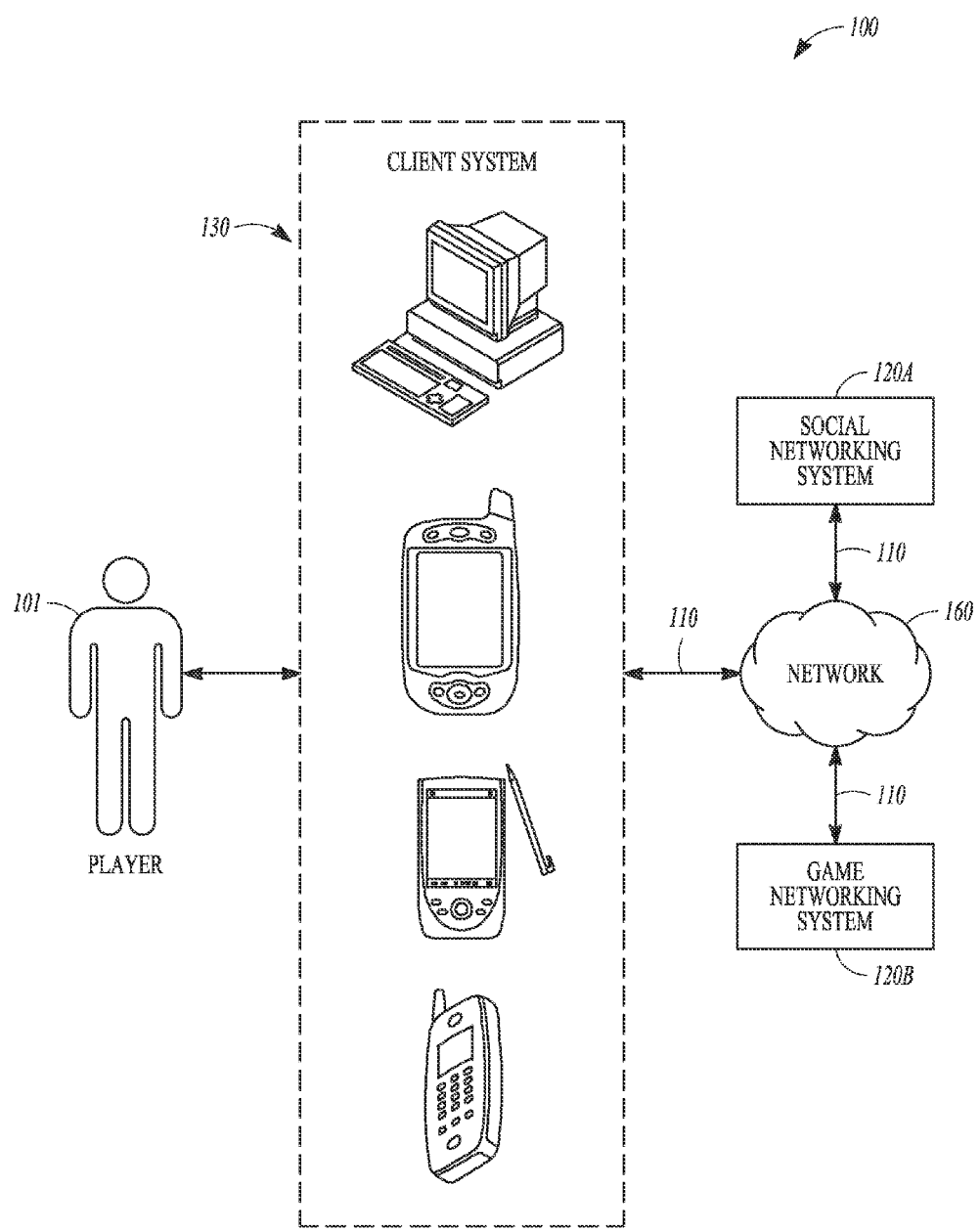
FIG. 1 is a block diagram illustrating an example of a system fur implementing various disclosed embodiments.

Although the aspects of the present invention are described below with reference to specific example embodiments, it will be evident that various modifications and changes may be made to these embodiments without departing from the broader spirit and scope of the invention. Accordingly, the specification and drawings are to be regarded in an illustrative rather than a restrictive sense. In particular, although the present disclosure is focused on various embodiments of mobile gaming applications, the following provides an overview of an interactive game networking system which describes features of an example network-deployed game applicable to both mobile and non-mobile settings.

A variety of types and configurations of a mobile computing device may be configured for executing instructions in connection with a game deployed on the mobile computing device. Mobile computing devices include but are not limited to portable, self-powered devices such as smartphones, PDAs, media players, and tablet computers. One or more games may be provided to users on the mobile computing device through either a standalone software application, or as an internet-based game (for example, as a flash game viewed through a web browser on the mobile device). As a further example, the mobile device game may be provided as a downloadable mobile software application (commonly referred to as an "app") for execution on specific software platforms such as the Apple iOS operating system, or the Google Android operating system.

The mobile game may be configured as a customized version of an existing non-mobile game, such as a mobile version of an internet-based game popularized on a social network service. Alternately, the mobile game may provide the same game play as a non-mobile version of the game, but containing mobile-specific features and functions when ported to the mobile device.

In some examples, various techniques are described herein for providing game functionality and features specific to aversion of a game provided to mobile devices. These features may include a variety of techniques for connectivity between a mobile game and a non-mobile game (which may be the same version of games, related games, or even non-related games), including: incentivized techniques for cross-promotion between mobile and non-mobile games based on activities occurring in either the mobile or non-mobile games; providing gaming rewards to the non-mobile game in connection with game play occurring in the mobile game; and sending game information such as characteristics, rewards, and in-game messaging between the mobile and non-mobile versions of the game.

Other techniques described herein include enhancements to a game on a mobile device based on considerations of mobile device-specific features and limitations. For example, the game may enact graphical changes to the display of the mobile game based on screen resolution and size considerations of the mobile device. The game may also utilize mobile networking messaging and notification services in connection with game play.

Gaming content and game play updates also may b deployed to the mobile game through server-side updates, application updates, and other updating capabilities unique to the mobile device. Unique identification of the mobile device on a mobile device network may also be used for player tracking or various analytics related to the game. Additionally, features of a mobile device software development platform, such as user interface functionality provided by a mobile device SDK, may be integrated into the user interface of the game.

While the terms "mobile" and "non-mobile" versions are used throughout, it will be understood by one skilled in the art with the benefit of Applicants' disclosure that the disclosed techniques may be equally applicable to applications in general (e.g., productivity applications, expense applications, and the like) and not limited to just games. As will equally be understood by one skilled in the art with the benefit of Applicants' disclosure, these techniques may be equally applicable to connectivity and features (e.g., cross promotions, rewards, communications, and the like) between two different applications—either two different instances of the same application executing on different application platforms (e.g., the same game running on Android and Windows) or two different applications (e.g., a CityVille game and a Mafia Wars game) which may or may not be executing on the same platform.

FIG. 1 illustrates an example of a system for implementing various disclosed embodiments, In particular embodiments, system 100 comprises player 101, social network system 120A, and game networking system 120B, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, un extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120A is a network-addressable computing system that can host one or more social graphs. Social networking system 120A can generate, store, receive, and transmit social networking data. Social network system 120A can be accessed by the other components of system 100 either directly or via network 160. Game networking system 120B is a network-addressable computing system that can host one or more online games. Game networking system 120B can generate, store, receive, and transmit game-related data, such as, for example, game account data, game input, game state data, and game displays. Game networking system 120B can be accessed by the other components of system 100 either directly or via network 160. Player 101 may use client system 130 to access, send data to, and receive data from social network system 120A and game networking system 120B. Client system 130 can access social networking system 120A or game networking system 120B directly, via network 160, or via a third-party system. As an example and not by way of limitation, client system 130 may access game networking system 120B via social networking system 120A. Client system 130 can be any suitable computing device, such as a personal computer, laptop, cellular phone, smart phone, computing tablet, etc.

Although FIG. 1 illustrates a particular number of players 101, social network systems 120A, game networking systems 120B, client systems 130, and networks 160, this disclosure contemplates any suitable number of players 101, social network systems 120A, and game networking systems 120B, client systems 130, and networks 160. As an example and not by way of limitation, system 100 may include one or more game networking systems 120B and no social networking systems 120A. As another example and not by way of limitation, system 100 may include a system that comprises both social networking system 120A and game networking system 120B. Moreover, although FIG. 1 illustrates a particular arrangement of player 101, social network system 120A, game networking system 120B, client system 130, and network 160, this disclosure contemplates any suitable arrangement of player 101, social network system 120A, game networking system 120B, client system 130, and network 160.

The components of system 100 may be connected to each other using any suitable connections 110. For example, suitable connections 110 include wireline (such as, for example, Digital Subscriber Line (DSL) or Data Over Cable Service interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WEAN, a WAN, a WWAN, a MAN, a portion of the Internet, a portion of the PSTN, cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120A, game networking system 120B, client system 130, and network 160, this disclosure contemplates any suitable connections between player 101, social network system 120A, game networking system 120B, client system 130, and network 160. As an example and not by way of limitation, in particular embodiments, client system 130 may have a direct connection to social network system 120A or game networking system 120B, bypassing network 160.

Mobile Device Gaming Applications

As used throughout the present disclosure, the term "mobile version" is generally distinguished from the term "non-mobile version". A mobile version of a gaming application is generally a software application that is tailored or customized for use with mobile computing devices. Mobile computing devices include smartphones, PDAs, tablets, media players, and other computing devices that are generally characterized as being portable and having smaller screens and operating capabilities than traditional desktop or notebook personal computer systems. The terms "mobile version" and "non-mobile version" are provided for convenience in the following sections but do not require that a separate machine-readable software application is created for each version (although a separate machine-readable software application may be commonly deployed for different operating system environments existing for each type of mobile computing device).

Further, the same gaming application may be packaged for execution on both a desktop personal computer and a mobile computing device; in such a scenario a "mobile version" refers to the set of gaming functionality or features that is provided via identified mobile devices, in contrast to a not fully overlapping set of gaming functionality or features that is provided in the "non-mobile version". As another non-limiting example, "a mobile version" might comprise a standalone software application "app" downloaded from a mobile device application store or market, whereas the "non-mobile version" might comprise a Flash software application running in a browser, potentially in connection with display on a social networking website or a gaming website.

Mobile Device Game Tracking

The mobile version of the game may be provided for execution as either an anonymous user or as a user associated with a predefined user account. For example, a user associated with a predefined user account may provide login information for an account established with a social networking service. In such an example, game play occurring on the mobile version can be easily tracked and associated with known user credentials.

In one embodiment, the mobile version of the game may also support game play as an "anonymous" user while still maintaining user tracking. The mobile version, deployed in either a standalone software application or a browser-based application, may allow players to establish a gaming session without having to login or create an account. This may be accomplished by transmitting a unique identifier of the mobile device from the mobile device to a game networking system responsible for hosting or maintaining the game. For example, in the Apple iOS operating system, this may be the UDID of the device. By tracking a unique identifier of the mobile device, the game networking system may provide the user with access to a specific game (and thus resume game play from previous gaming sessions) without needing login information or a username/password to lookup the user.

In a further embodiment applicable to smartphone mobile devices, a user profile is established at the game networking system and associated with a phone number identifier transmitted over a network. Thus, in such a setting, game preferences, game status, and user account information may be associated with a phone number.

The previously described techniques for player tracking may also be incorporated to various features of analytics tracking and statistics applicable to either the specific user (anonymous or login-associated users) or a larger network of game play users. For example, the game networking system may track the duration of time between game play for specific anonymous users, and attempt to provide promotions such as SMS text messages or push notifications to a smartphone mobile device to induce game play. Another detailed example might be tracking anonymous or login-associated users for a certain level of inactivity, such as no game play in 30 days, to target for specific promotions to encourage or increase game play.

Mobile Device Gaming Incentives and Cross-Promotions

A game may be designed to provide various incentives and rewards to encourage game play and activities (and thus increased usage of the game) within both a first version of the application (e.g., a mobile version of a game) and a second version of the application (e.g., a non-mobile version of the game). As discussed below, these incentives and rewards may be offered within the mobile version of the game or the non-mobile version of the game, to ideally result in increased game play and loyalty towards both game versions. Thus for example, the reward may be offered in the first version (e.g., the mobile version of the game) for playing the second version of the application (e.g., the non-mobile version of the game) or vice versa.

Although the following disclosure generally suggests use of the same or a closely-related variant of the same game for the mobile version and the non-mobile version, it will be recognized that similar cross-promotion techniques and rewards may be similarly provided in connection with generally related or unrelated games and types of games. In one embodiment, the mobile version of the game may contain some overlapping features and rules as the non-mobile version, but in a simplified form for quicker gameplay or for use on a smaller screen.

In various embodiments, a mobile version of a game may provide a variety of enhancements for game play in connection with use of a non-mobile version of the game. These enhancements may include various rewards, incentives, and messages deployed within the gameplay or game promotions of the non-mobile version, in order to encourage the user to conduct certain activities in connection with the mobile game. For example, rewards may be offered to encourage the gaming user to download the mobile version of the game, connect the mobile version of the game to a social network, or associate and connect the mobile version of the game to the non-mobile version of the game. Other rewards or promotions might be offered to encourage users to invite friends of the non-mobile version of the game to download the mobile version, or join the user in gameplay on the mobile version.

Figure 2:
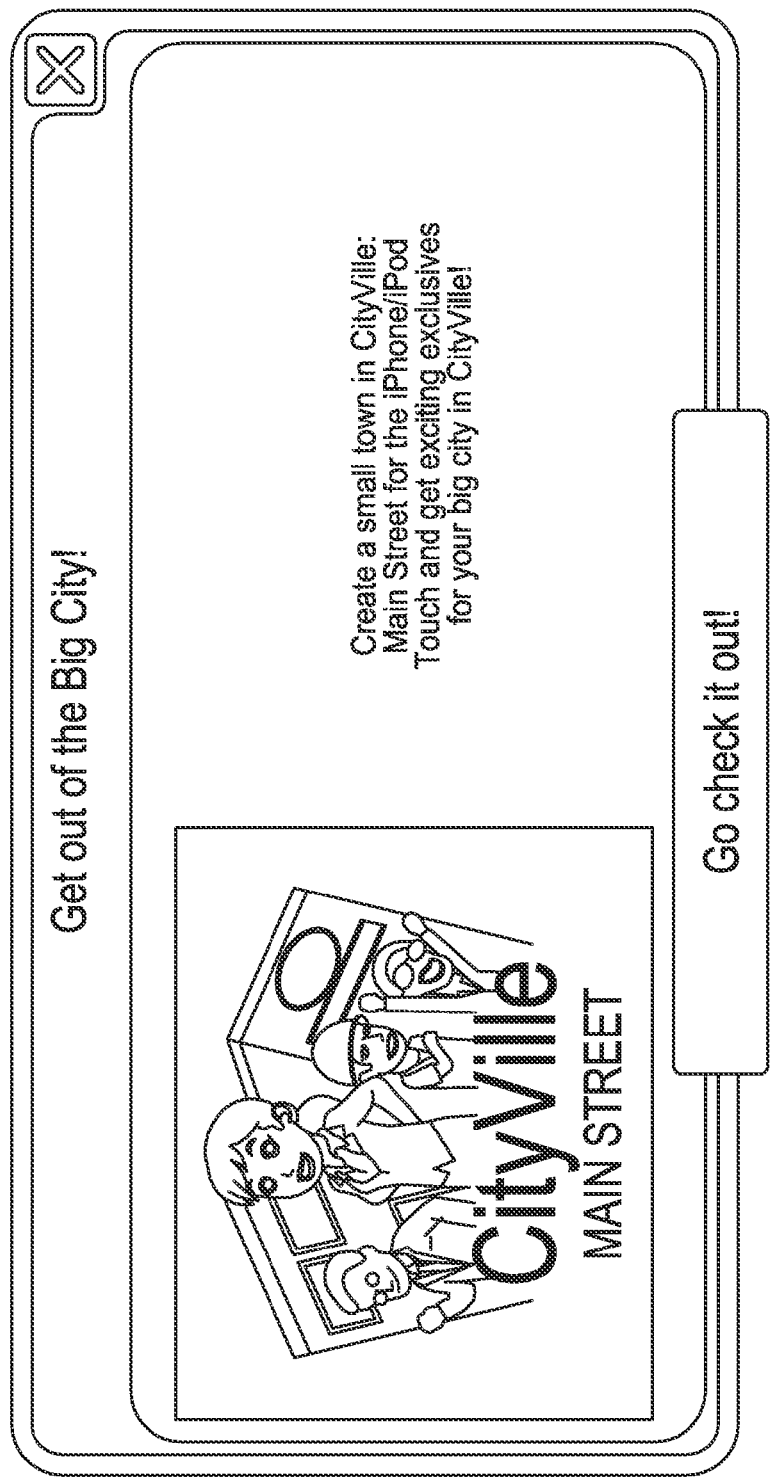
FIG. 2 is an illustration of a user interface for cross-promotion between mobile and non-mobile versions of a game according to one embodiment.

FIG. 2 provides an example of marketing promotions aimed at users of the non-mobile version of the game. As illustrated, in a website version of the non-mobile version of the game, website users may view a promotion for the mobile game. For example, FIG. 2 shows a title "Get Out of the Big City!" with a description "Create a small town in CityVille: Main Street for the iPhone/iPod Touch and get exciting exclusives for your big city in CityVille!" Selecting the promotion results in sending the user to the appropriate location to download the mobile version of the game, such as through direct link to an application store or market, or by an email or SMS message with a link to obtain the mobile version.

In other embodiments, incentivized promotions may be offered to users of the non-mobile version of the game in connection with game play occurring on the mobile version of the game. Thus, a certain task performed or achievement reached in the mobile version of the game may result in a specific action or reward to the non-mobile version of the game. This reward may be communicated from the mobile device to a common server, or delivered as a message between the mobile device and the server. The reward may be customized to fit in within the goals and strategies of game play, such as the "delivery" of the reward from a character in a simulation-type game. Likewise, incentivized promotions may be offered to users of a non-mobile version of a game, in connection with game play occurring on the mobile version of a second unrelated game.

As an example, achievements in the mobile version of game (such as reaching a certain level; completing certain tasks; playing the mobile version for a certain duration of time, etc.) may reward the same user or related user of the non-mobile version of the game. Such a reward may include game credits, game play items, gifts, and other items of value based on the amount of usage of the mobile version of the game.

Figure 3:
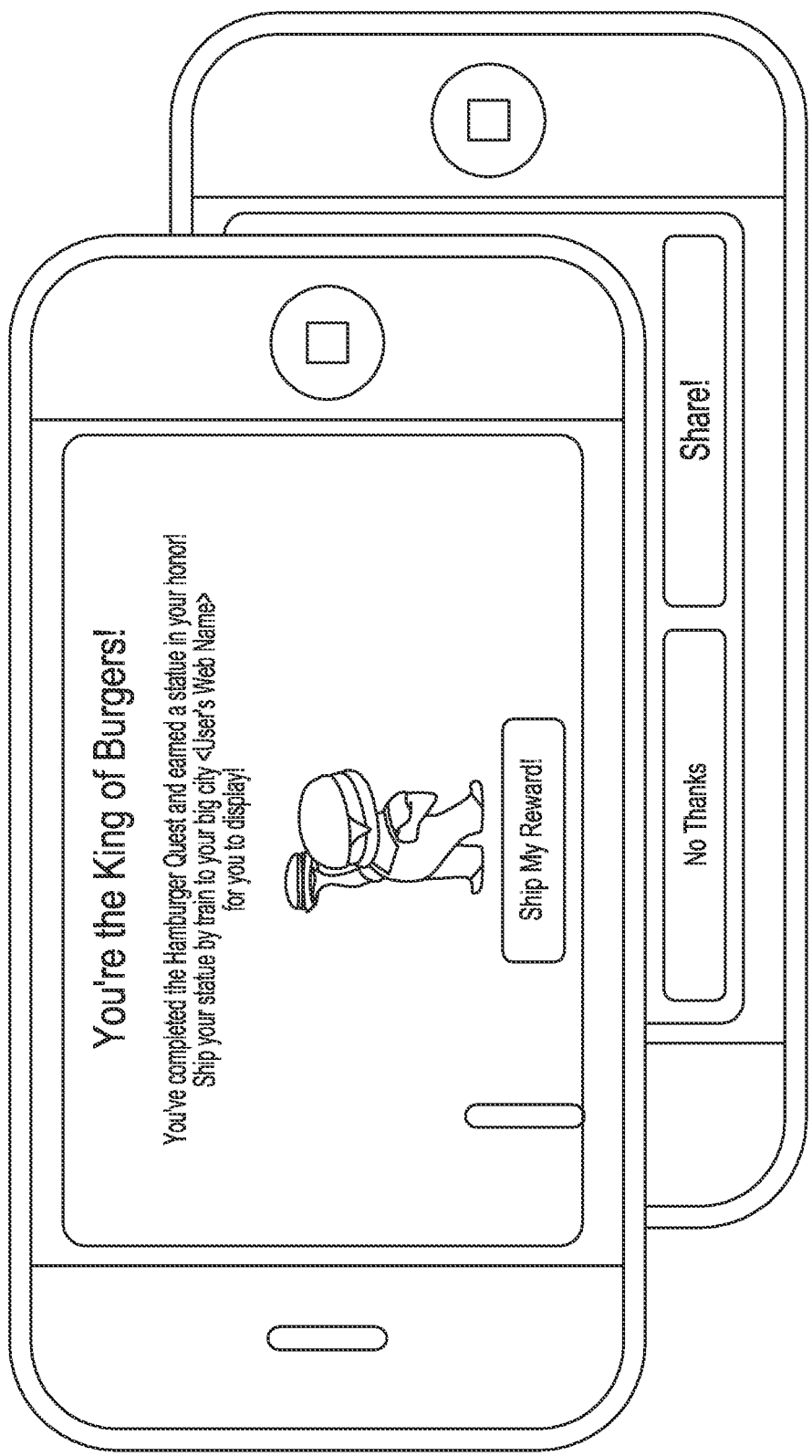
FIG. 3 is an illustration of another user interface for cross-promotion between mobile and non-mobile versions of a game according to one embodiment.

FIG. 3 provides an example of further marketing promotions aimed at a user of the mobile version of the device presenting an award for gameplay achievement in the mobile version of the game for use in the non-mobile version of the game. For example, in FIG. 3 the mobile screen says "You're the King of Burgers! You've completed the hamburger Quest and earned a statue in your honor! Ship your statue by train to your big city <User's Web Name> for you to display!" The user is then offered a button which says: "Ship My Reward!" In other examples, the user may click a "No Thanks," button or "Share!" button to share the reward with someone else.

Figure 4:
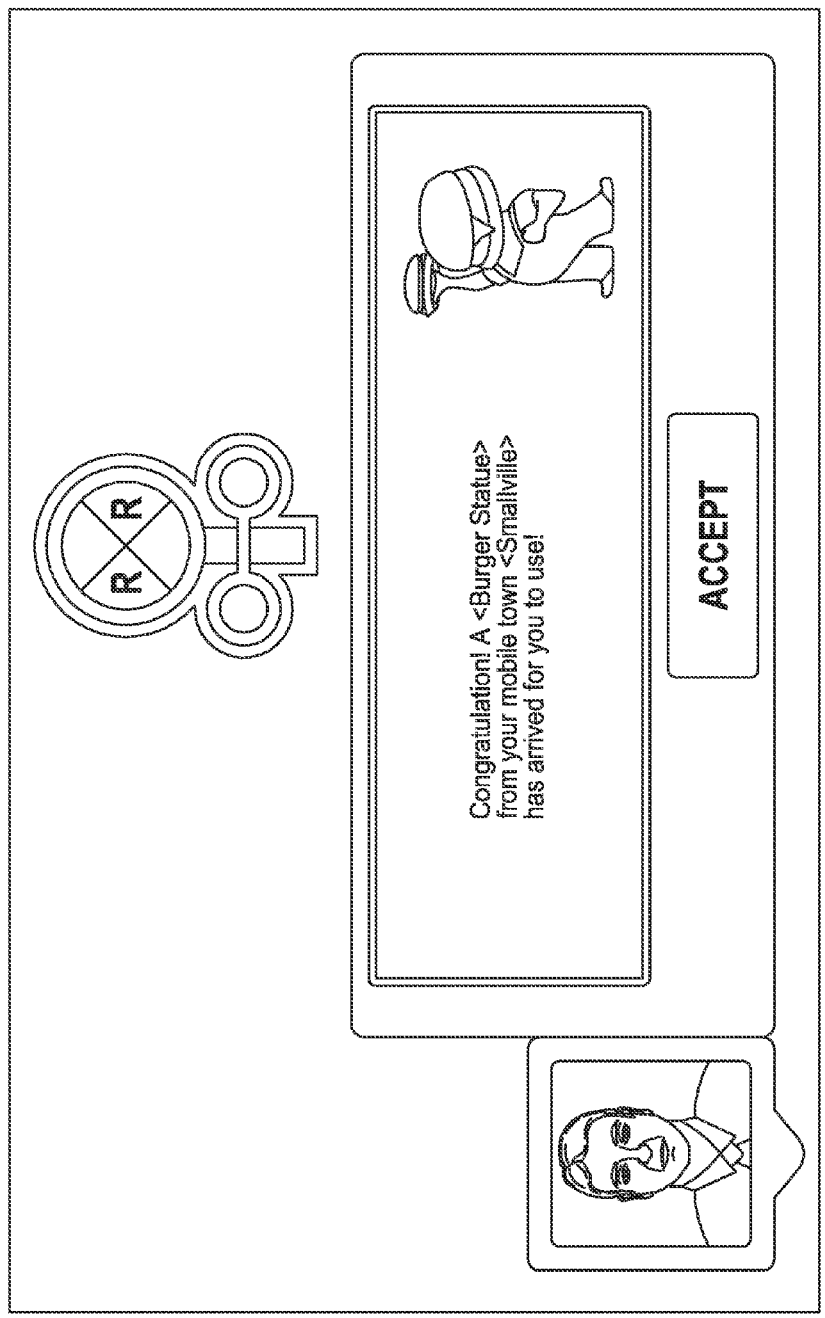
FIG. 4 is an illustration of another user interface for cross-promotion between mobile and non-mobile versions of a game according to one embodiment.

Next, as illustrated in FIG. 4, the user in the non-mobile version is able to view the reward, accept the reward, and use it in connection with game play. As shown in FIG. 4, the non-mobile version is able to "deliver" an item to the non-mobile version from the mobile version. In the example of FIG. 4, a train crossing icon is displayed in the non-mobile version to signal the ability to deliver the reward along with a message "Congratulation! A <Burger Statue> from your mobile town <Smallville> has arrived for you to use," and a button labeled "Accept." Selecting the icon may initiate a delivery animation. In some examples, this may be a train which delivers the reward. The reward then becomes part of the inventory of the non-mobile game upon acceptance. In other examples the reward may be capable of utilization in both the non-mobile and the mobile version of the game. In some examples, a particular reward (e.g., a cell phone store) may provide continuing rewards (e.g., goods, money, or the like) for both versions (e.g., the same money "harvested" or collected from the cell phone store may be added to both the mobile and non-mobile version) or the user may select which version to provide the continuing reward for.

The user may further unlock an exclusive good (reward) in the non-mobile version of the game, as a result of installing or reaching a certain achievement in the mobile version of the game. Such exclusive reward may occur as part of a targeted promotion which requires the user to accept, or the exclusive reward may occur automatically upon reaching certain levels or completing activities.

Figure 5:
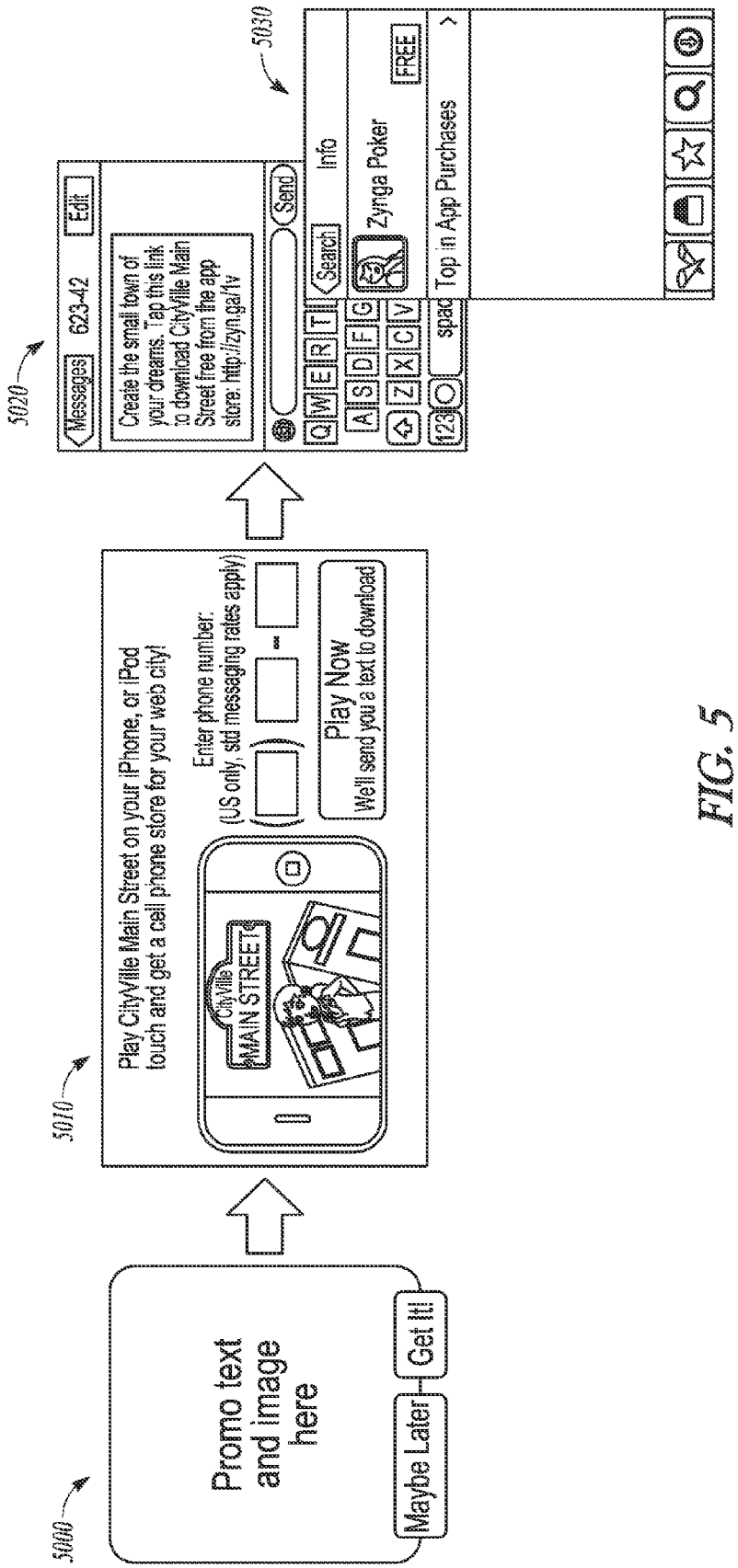
FIG. 5 is an illustration of a flow for promotion of a mobile version of a game within a non-mobile version of the game according to one embodiment.
Figure 6:
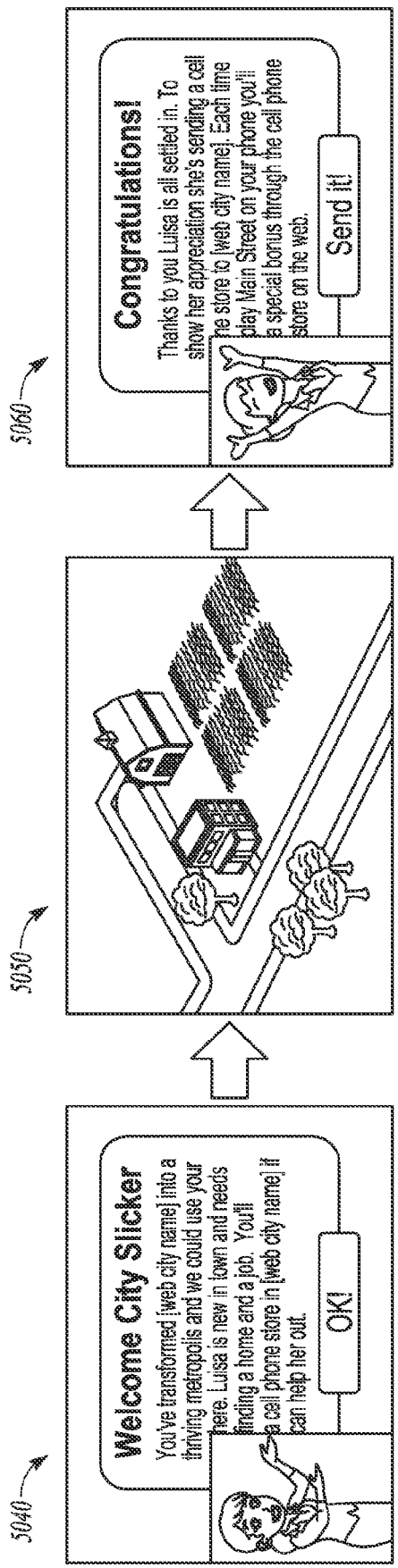
FIG. 6 is a further illustration of a flow for promotion of a mobile version of a game within a non-mobile version of the game according to one embodiment.

FIGS. 5-7 provide a further illustration of obtaining a specific exclusive reward in a simulation game according to one embodiment, to induce non-mobile users to download and conduct gaming activities in a mobile version of the game. As shown in FIG. 5, the player sees a "cell phone store" prompt 5000 in the non-mobile version of the game which tells them about the promotion. Prompt 5000 says "Promo text and image here" with a button stating "Maybe Later," and "Get it!" An optional cell phone store task may appear to the user to keep them informed of this promotional goat Tapping the "Get It" button on the prompt or the quest icon opens a 'Send SMS' frame 5010, where the player enters their phone number, receives an SMS with a link to the mobile version in the app store 5020, and downloads the game by utilizing the link 5030. The SMS frame 5010 in the example of FIG. 5 gives a promotional message: "Play Cityville Main Street on your Iphone, or IPod touch and get a cell phone store for your web city!" along with a prompt to enter your phone number and a "Play Now—We'll send you a text to download" button. The SMS 5020 in the example of FIG. 5 includes a message "Create the small town of your dreams. Tap this link to download. CityVille Main Street free from the app store." Once the SMS link is selected, the user is taken to the app store where the user may download the app and/or the user may see information on the application.

Next, as shown in FIG. 6, when players login with the mobile version e.g., by signing into the social networking service), the game networking service recognizes that the user is a player of the non-mobile version, and presents a specific message 5040. In the example of FIG. 6 the message is "Welcome City Slicker, You've transformed [web city name] into a thriving metropolis and we could use your help here. Luisa is new in town and needs help finding a home and a job. You'll be given a cell phone store in [web city name] if you can help her out." The user plays until reaching a specific achievement 5050, and then the user is notified that the achievement was reached and how the achievement reward can be used and "sent" to the non-mobile version of the game 5060. In the example of FIG. 6, the achievement is presented along with a message which reads "CONGRATULATIONS! Thanks to you Luisa is all settled in. To show her appreciation she's sending a cell phone store to [web city name]. Each time you play Main Street on your phone you'll earn a special bonus through the cell phone store on the web."

Figure 7A:
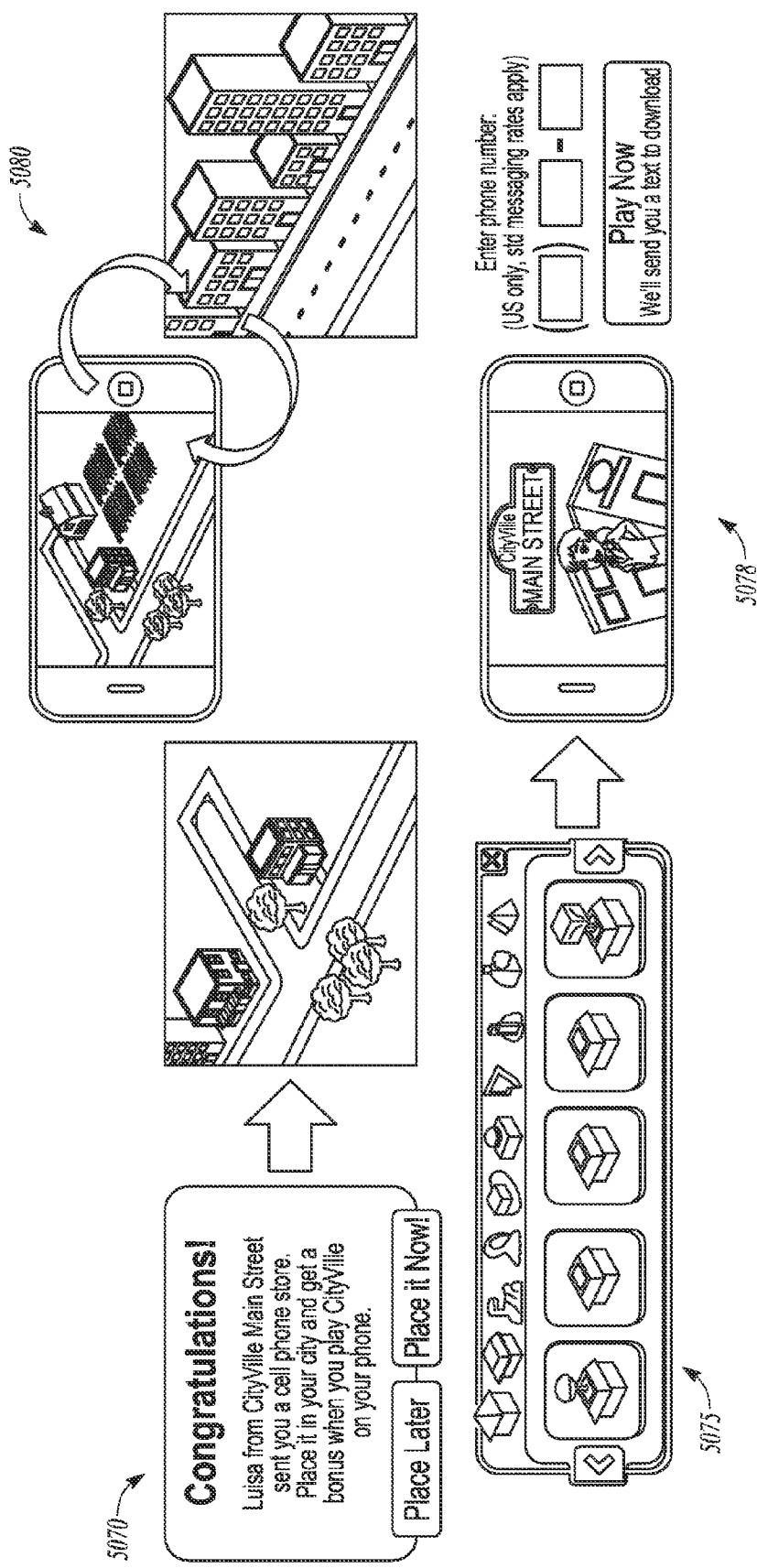
FIG. 7A is a further illustration of a flow for promotion of a mobile version of a game within a non-mobile version of the game according to one embodiment.

Finally, as shown in FIG. 7A, the next time the user plays the non-mobile version of the game, the user is provided with a prompt telling them how the reward works and can be played in the game 5070. In the example of FIG, 7A the prompt says "Congratulations! Luisa from CityVille Main Street sent you a cell phone store. Place it in your city and get a bonus when you play CityVille on your phone," along with buttons labeled "Place Later," and "Place It Now!" The reward may be further tied to play on the mobile version, such that each time the user plays the mobile version, further activity with the reward becomes possible (with a maximum amount of activity in, for example, 24 hrs). 5075 shows a list of particular items in the non-mobile version of the game. Selection of a particular item in the non-mobile version of the game that requires achievements in the mobile version of the game takes the player to a prompt for downloading the mobile version of the game 5078 if they have not already downloaded the mobile version (in the Example of FIG. 7A through a phone number prompt so an SMS may be sent with a link). In some examples, each time the user plays on the mobile version, the system may activate an in-game benefit for the non-mobile game 5080.

Such rewards and cross-promotions offered between the mobile version of the game encourages users not only to keep playing the mobile version of the game, but also to keep accessing and playing the non-mobile version of the game. It would be recognized that other variations between gameplay occurring in the non-mobile and mobile versions may be repeatedly exchanged and encouraged with such rewards.

Variations to the aforementioned cross promotions between games may be defined and deployed over a network to selected users satisfying certain rule-based conditions. For example, games may access the game networking system to obtain a list of cross-promotions the player is eligible for, followed by the display one or more of those promotions. Thus, in a non-mobile version, if player opts into an "install a new mobile application" promotion, they may be directed to an application store or market to install the game and play.

Mobile versions of the games may log certain achievements (install, level-up, etc.) to the promotional platform for all users, regardless of whether the users have opted into a promo. Thus, if the achievement completes upending cross-promotion for a player, the promotion is marked as complete. When the player opens the non-mobile version of the game, it may verify if any cross-promos are complete but not yet awarded, to enable the reward to be granted and provided to the player.

The cross-promotion information sent between games may be provided in a variety of ways, including messaging directly from the mobile device to a messaging server; directly from the non-mobile version or the mobile version of the game to the game networking system; or other types of electronic communications.

Other incentives and rewards offered in the mobile version of the game may be offered in connection with social networking activities. For example, rewards may be offered for users conducting activities in social-related invitation activities and flows. A social flow may be provided to users in the form of a wizard-based setting, querying users in either a non-mobile version of a game, or a mobile version of the game, to invite additional friends and other known users to join in the game play or conduct certain game play activities.

For example, at each step of the social flow, a user can collect points in the game (once a day or at another interval) by recruiting new users. When the friend moves on to the next step, the recruiting user may also collect a reward (up to a certain time-based limit), identification of users may occur based on membership and friend relationships in a social network setting, or may be provided with a custom specification of appropriate users identified by email address, phone number, online handle, or another identifier.

The social flow offered in a mobile version of the game may also correlate with social networking activities occurring in the non-mobile version of the game. For example, a user of the mobile version of the game may want to invite friends associated with a linked or unlinked social networking account. Additionally, the mobile version of the game may be configured to invite other users for gameplay independent of a social network membership. For example, a contact list provided in a smartphone phone book may be used with the social flow in order to identify or invite potential friends via a SMS message.

Other incentives may be offered in connection with linking the mobile version of the game to a non-mobile version. For example, a welcome package with various free or low-cost rewards may be offered to induce the user of the mobile version of the game to connect with a social networking service (and thus any associated non-mobile games conducted on the social networking service). This may be presented in the context of a "goal" of the gameplay for the mobile version of the game. In a similar fashion, game characters, elements, and other rewards may be "delivered", "moved", or "copied" from the non-mobile version of the game to the mobile version of the game (or vice versa) as a result of incentives and promotions after linking the accounts.

Thus, rewards can be offered for linking the non-mobile version and the mobile version of the games (such as by providing a social network login used with the non-mobile version). The reward may scale based on activities occurring in either game, with the amount or value of rewards increasing as each game has achievements met.

Figure 7B:
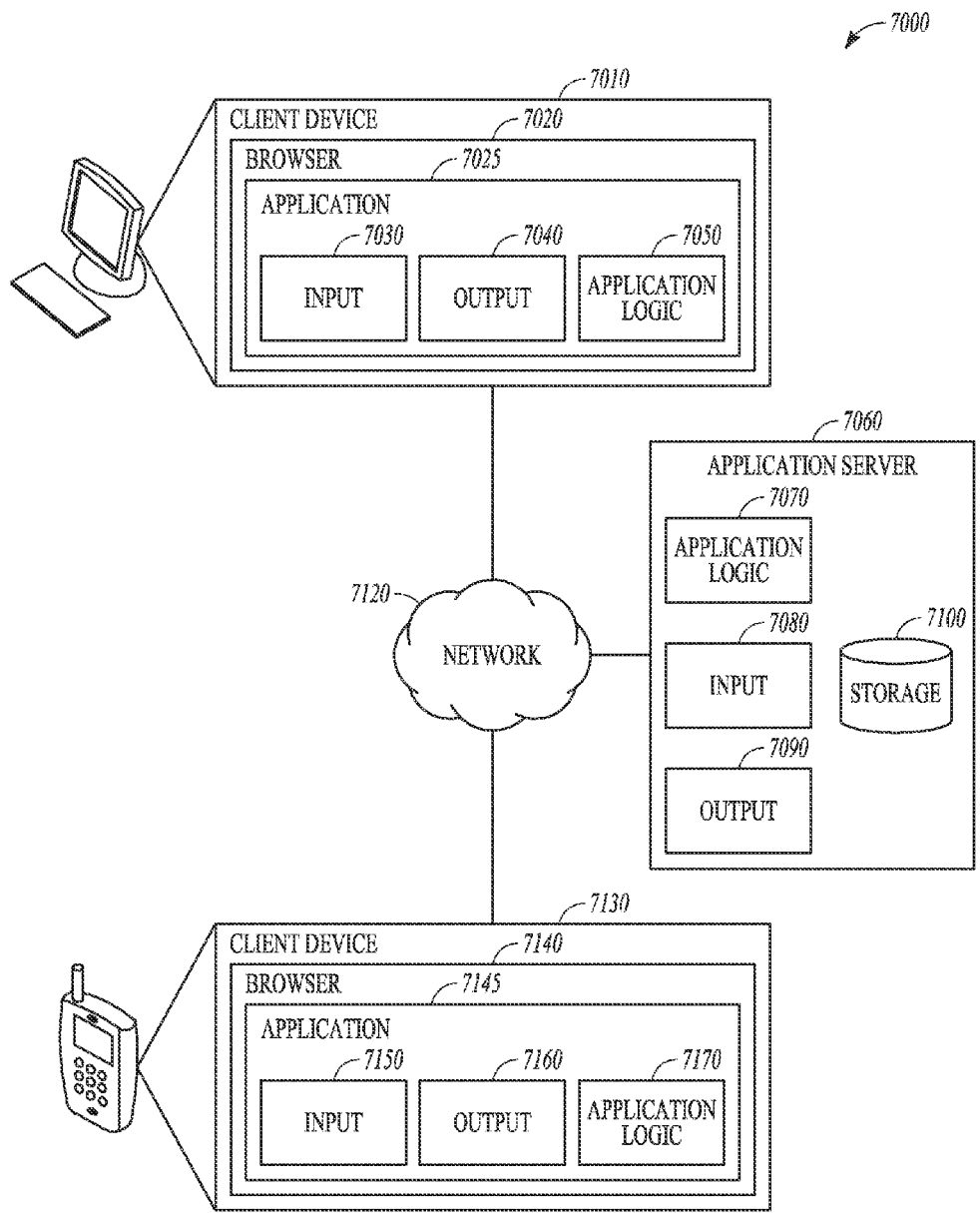
FIG. 7B is a block diagram illustrating an example of a system for implementing various disclosed embodiments.

FIG. 7B shows an example system 7000 configured to facilitate cross application promotions according to some examples of the present disclosure. Client device 7010 may be a laptop, desktop, tablet, mobile device, or other computing platform. A computing platform may include a specific combination of computing hardware (e.g., computer processor, memory, display components, or the like) and the operating system which allows for applications to utilize this hardware. For example, client device 7010 may be a desktop computer running the Microsoft Windows® family of operating systems provided by Microsoft Corporation of Redmond Wash., or a laptop running an OSX family of operating systems provided by Apple Computer, Inc., of Cupertino Calif. In some examples, client device 7010 and client device 7130 may be the same or different computing platforms. For example, client device 7010 may be a laptop executing the Microsoft Windows or iOS operating systems, whereas the client device 7130 may be a mobile device executing the Android operating system provided by Google, Inc., of Mountainview Calif., or running an iOS family of operating systems provided by Apple.

Client devices 7010 and 7130 may run various applications including browsers 7020 and 7140. Browsers 7020, 7140 may include Microsoft Internet Explorer, provided by Microsoft Corporation, Safari provided by Apple, Chrome provided by Google, or the like. Applications 7025 and 7145 may execute within browsers 7020 and 7140 and may be or include JavaScript, Flash, Silverlight, HyperText Markup Language (HTML), eXtensible Markup Language (XML), or other components, which when executed within browsers 7020 and 7140 may provide the functionality of applications 7025 and 7145, respectively. In other examples, applications 7025 and 7145 may be stand-alone applications not executed within browsers 7020 and 7140.

Applications 7025 and 7145 may be one or more applications such as gaming applications, productivity applications, or the like. Applications 7025 and 7145 may include one or more modules. Applications 7025 and 7145 may be the non-mobile and mobile versions of the application (e.g., the game) respectively. Input modules 7030 and 7150 may allow for accepting and processing user input into the application and for receiving information over a network 7120 from external sources such as application server 7060 or other applications. Output modules 7040, 7160 may display output to a display device (e.g., Liquid Crystal Display, Cathode Ray Tube, or the like) according to commands issued by the application logic modules 7050 (e.g., a game play module). Application logic modules 7050, 7170 may control the output of the application and respond to one or more inputs of the application (delivered from the respective input modules) according to the rules and logic implemented in the application logic modules 7050, 7170. For example, in the case of a computer implemented game application, the application logic modules 7050, 7170 may be a game logic module which implements the rules of the game.

Application logic modules 7050 and 7170 may also communicate with application server 7060 through output module 7040 over network 7120. Network 7120 may be any network capable of allowing communication between client devices 7010, 7130 and application server 7060. For example, network 7120 may be or include part of the Internet, a Wide Area Network, a Local Area Network, a Cellular Network, or the like. Application logic modules 7050 and 7170 may communicate application information to the application server 7060. For example, application information may include application states, or progress. In some examples, application logic modules 7050 and 7170 may contain all the logic necessary to provide applications 7035 and 7145. In other examples, application logic modules 7050 and 7170 may contain some of the logic necessary to provide applications 7035 and 7145 and the rest of the logic may be provided by application module 7070 of application server 7060. Applications 7025 and 7145 may send application state, user inputs, or other information to application server 7060 for processing by application module 7070. In response application module 7070 may provide applications 7025 and 7145 with update application state information or other commands.

Application server 7060 may contain an input module 7080 to process information sent by client devices 7010 and 7130 and an output module to send information to client devices 7010 and 7130. In some examples the output module 7090 may provide to client devices 7010 and 7130 the application code for the applications 7025 and 7145.

Application server 7060 may include a storage device 7100 for storing application information sent to applications 7025 and 7145 or sent from applications 7025 and 7145. Application module 7070 may utilize information regarding the application state of applications 7025 and 7145 to determine whether or not to enable additional features (e.g., rewards) to one or both of applications 7025 and 7145. For example, application module 7070 may determine that a particular user of application 7145 has reached a particular achievement, milestone, or has triggered one or more (or a series) of application events. Responsive to determining that the user has reached a particular achievement, milestone, or event, application module 7070 may determine if the user also utilizes another application (e.g., application 7025) which may be associated with the application 7145. An association may include a cross-promotion association, For example, the application module 7070 may be configured to associate applications 7025 and 7145 such that completing certain activities or game events, achievements, milestones, quests, or the like on either application may allow the user to Obtain rewards or other benefits in the other application. In some examples, these associated applications may be the same applications on different computing platforms, may be different applications on the same computing platform, or different applications on different computing platforms.

If the user completes a task on an associated application the application module 7070 may contact the other application to notify the associated application that a reward or other benefit is available for that user. The associated application may then provide the reward or other benefit for that user. For example, application server 7060 may be notified that a user has completed a certain task on application 7145, and thus update the game records of the user in storage 7100 for application 7025 to reflect a cross platform promotional reward which may be associated with the completion of the task for application 7145. The next time the user plays application 7025, application 7025 may be notified by application server 7060 that a reward is available for that player and application 7025 may present the user with an opportunity to accept the reward.

In some examples, applications may be associated implicitly (e.g., based upon the user entering his/her phone number/downloading the game through a first associated application) or explicitly (the user explicitly links his/her accounts for each of the associated applications).

Figure 7C:
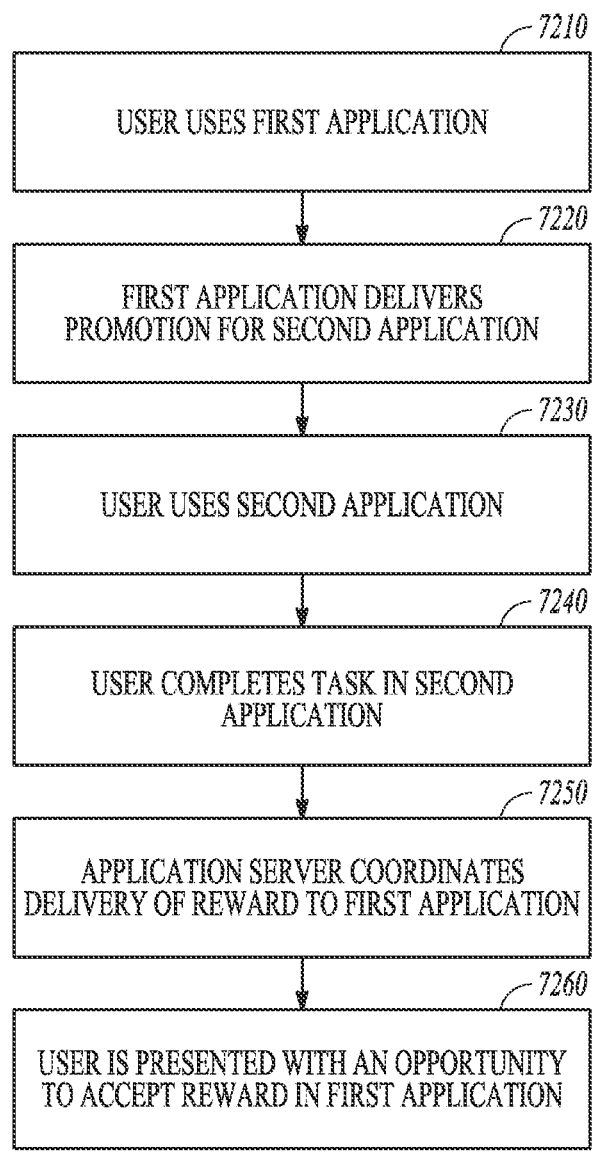
FIG. 7C is a flowchart illustrating an example of a method of implementing various disclosed embodiments.

FIG. 7C shows a flowchart of a method according to some examples of the present disclosure. At operation 7210 the user uses the first application (e.g., the non-mobile version of a gaming application). While using the first application the first application may deliver one or more promotional messages or other incentives to the user in an effort to have the user utilize a second application (e.g., a mobile version of a gaming application) at operation 7220. At operation 7230, the user uses the second application. At operation 7240, the user completes certain tasks in the second application. The application server may then recognize that a task has been completed in the second application which may entitle the user to a reward in the first application. The application server may then coordinate delivery of the reward to the first application at operation 7250. For example, upon execution, the first application may contact the application server, which may "push" the reward down to the first application. At operation 7260, the user may be presented with an opportunity to accept the reward in the first application. The application server may associate the user of the first application as being a user of the second application at any point in the method based upon explicit account linkages (e.g., the user expressly tells the application server of the linkage), or implicitly if the user clicks on, or otherwise interacts with, the promotion delivered in the first application. For instance, if the promotion delivered in the first application is a banner advertisement, if the user clicks on the banner, they may be directed to a download screen or a mobile number entry screen (such as shown in FIG. 5). The system may then link the user account associated with the first application with the mobile number entered.

Mobile and Non-Mobile Application Connections

As discussed above, the connection between the game play of the mobile and non-mobile versions of the game may include a variety of incentives, rewards, and marketable promotions. In a similar fashion, functionality may be provided to enable messages, requests, and game interactions to be exchanged between the game play of the mobile and non-mobile versions of the game.

One embodiment provides the ability for friends or other identified groups of users to ask for help or send social requests between the mobile version and the non-mobile version of the game. For example, friends that are playing the non-mobile version on a social networking service may be asked for help to perform a certain task for a friend using the mobile version of the game. Thus, a specific user in the non-mobile version of the game may receive requests for game play assistance even if the specific user does not play any mobile version of the game.

Figure 8:
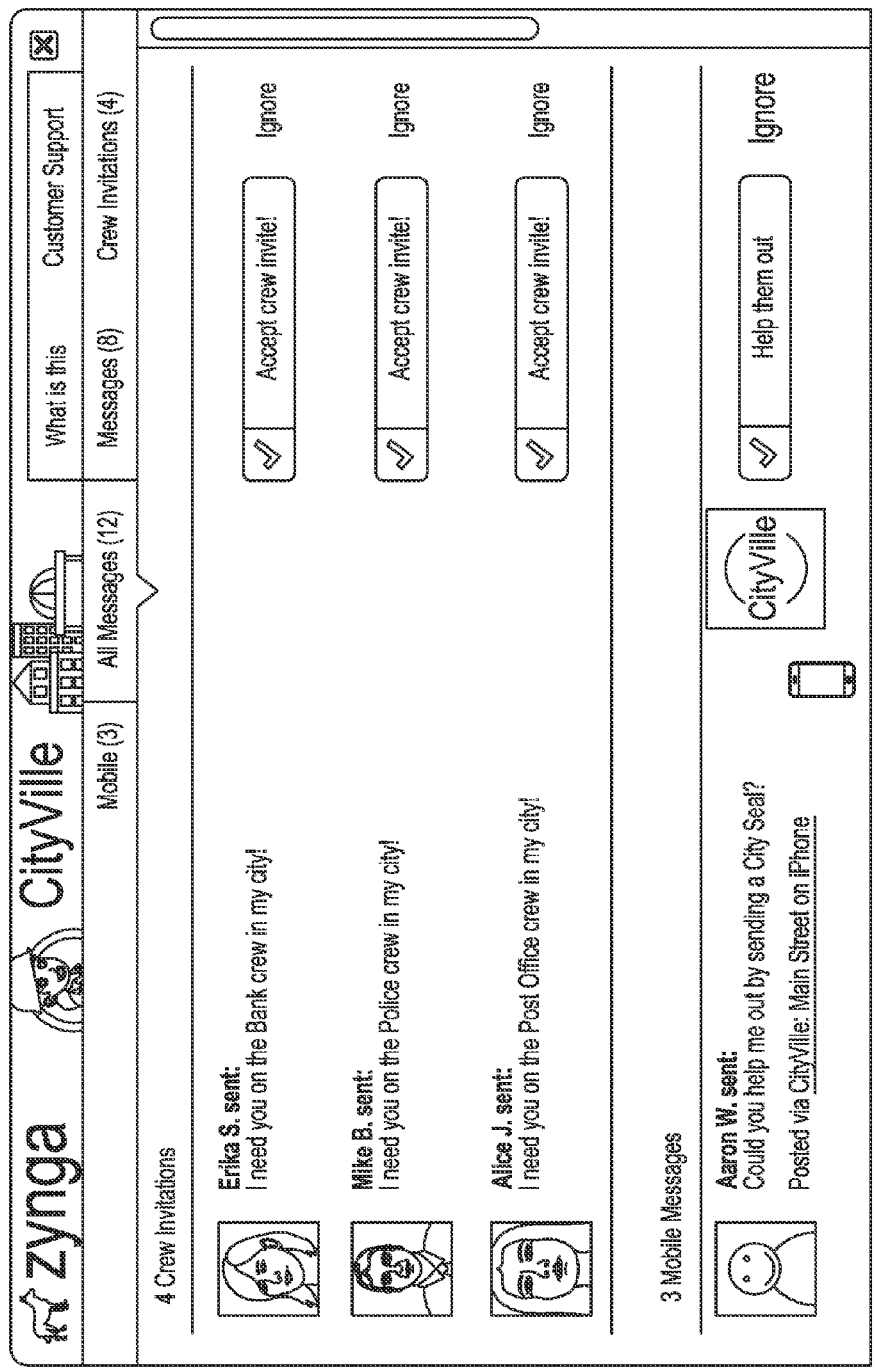
FIG. 8 is an illustration of a user interface for sending and receiving messaging between mobile and non-mobile versions of a game according to one embodiment.

FIG. 8 provides an illustration of various requests being provided and displayed to users of a non-mobile version of the game. As shown, the messages received by the users of the non-mobile version of the game may include messages and requests from mobile version users. The messaging interface may specifically note that the request was transmitted from the mobile version of the game (accompanied by a specific link or promotion to obtain the mobile version of the game). For example, a "mobile messages" section may be added to a game message center. As shown in FIG. 8, various usernames are displayed next to an avatar for a user with a message from the user and two buttons: "Accept crew invite!" and "Ignore." On the bottom, mobile messages are delivered with the username, an avatar, and a message along with an indication of what mobile game the message came from. Again, the two buttons are present.

Figure 9:
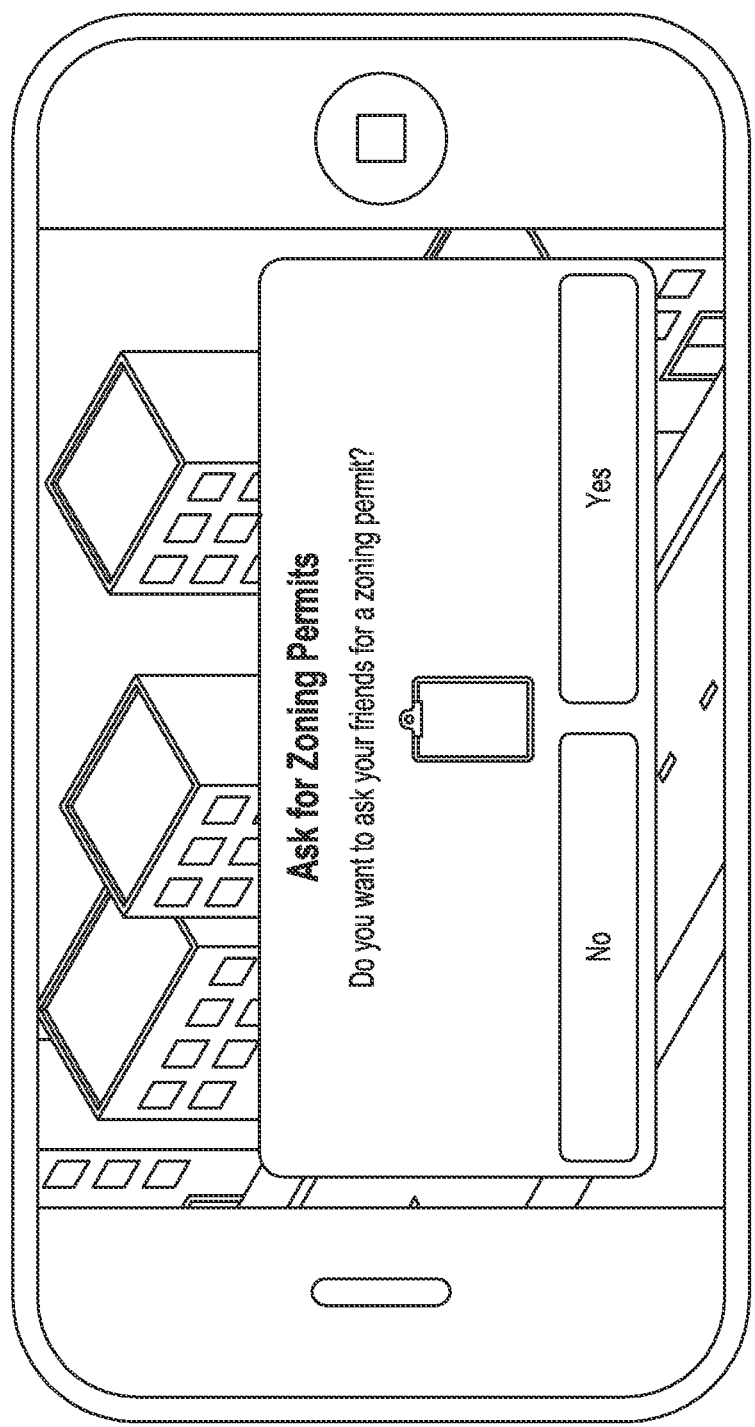
FIG. 9 is an illustration of a user interface for sending messaging from a mobile version of a game to a non-mobile version of the game according to one embodiment.

FIG. 9 provides an illustration of an example request initiated from a mobile version of the game. This may be a request for a specific item, virtual good, or other task to be completed by another user. As illustrated, the prompt asks whether the user of the mobile version wishes to ask friends for a certain item. Users of the mobile version of the game may transmit game requests from an associated game, even if the mobile game may differ slightly from the non-mobile game. If the user of the mobile version confirms and selects the appropriate friend for the request, then this request is transmitted to the selected friend playing the non-mobile version of the game. In the example of FIG. 9, the prompt says "Ask for Zoning Permits: Do you want to ask your friends for a zoning permit?" FIG. 9 also shows "Yes" and "No" choice buttons.

Figure 10:
FIG. 10 is an illustration of a user interface for receiving push notifications at a mobile version of a game according to one embodiment.

FIG. 10 provides an illustration of a request-related notification or response being presented back to the user of the mobile version of the game. As shown, after a user of the non-mobile version of the game acts on the request, a push notification is provided to the mobile device in connection with the mobile version of the game. Thus, after a non-mobile device user acts on a request, a push notification may he sent to the mobile device with a tailored message regarding the request, accompanied by an option to launch the mobile version of the game (or otherwise act upon the response in the game). In the example of FIG. 10, the prompt states "CityVille: Main Street Jon-Paul has sent you a City Seal!" with "Cancel" and "View" buttons.

Mobile Gaming Updates

Techniques for updating the mobile game application may be also provided to enable continuous game play with minimal interruption updates. One update technique includes applying patching to versions of an installed software application on the mobile device through user incentivized requests, and gameplay-disguised updates. Although an update to an installed software application on the mobile device may directly ask the user, "do you want to update application: yes or no?", often times users will delay the update in order to keep playing.

The goal of the following update techniques is to get players to update to the latest version of the game, thereby resulting in faster adoption of new features, changes, and software fixes; but without causing user annoyance or dislike of the update process. To accomplish this, update operations may be performed wherever possible in the background, accompanied by a series of promotions as necessary to hide updates and encourage the user to install the new content.

Figure 11:
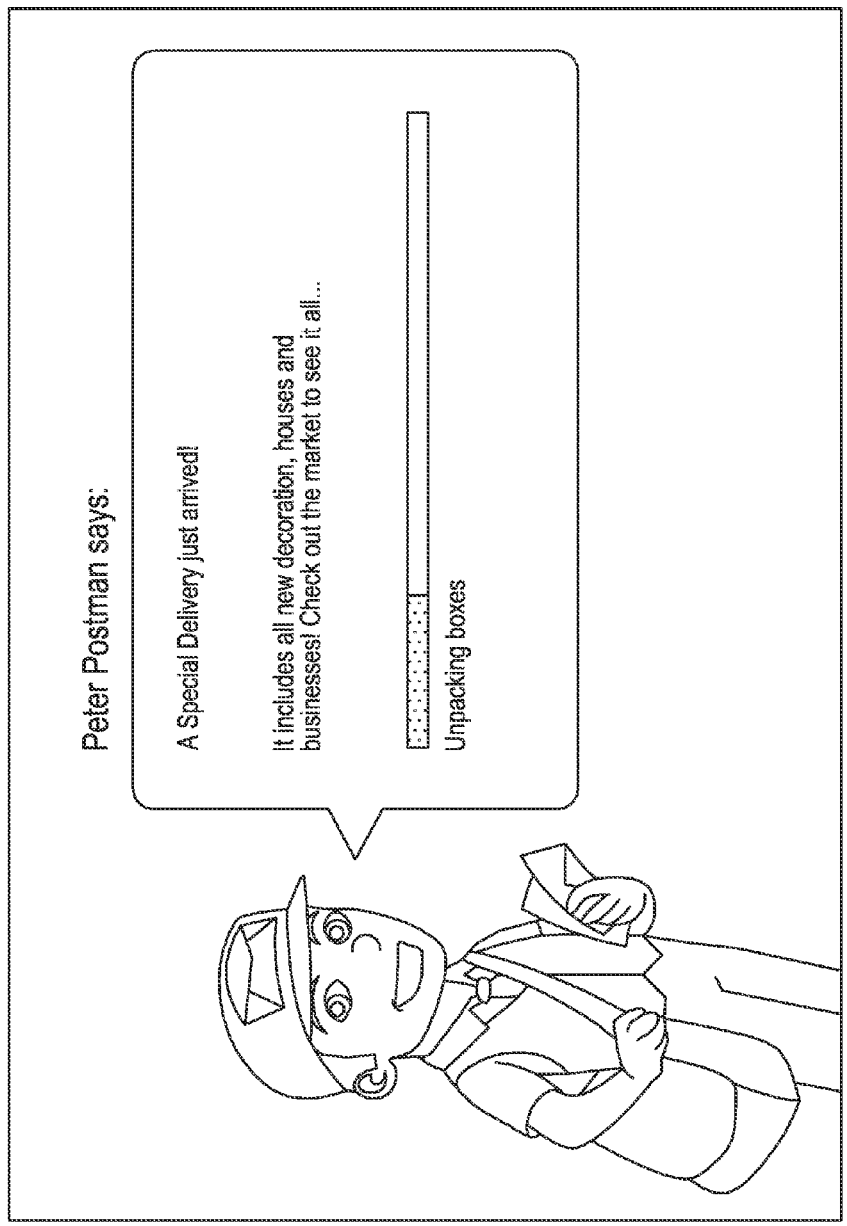
FIG. 11 is an illustration of a user interface for providing updates to a mobile version of a game according to one embodiment.

FIG. 11 provides an illustration of one technique for providing updates during game play, accompanied by a promotional incentive. As illustrated, when patching the mobile version games software, the gameplay is interrupted with a non-cancelable character dialogue. This can happen right after the game loads, prior to a specific defined action, or at a certain time. For example, friendly dialogue accompanied by a loading bar or other status messages may be presented to the user, accompanied by some suggestion of an incentive or enhanced feature. The subtitle of the loading bar will change, suggesting to the user that some gameplay operation or enhancement is taking place, thereby disguising the update process. For example, the subtitle may change in the following sequence: "checking invoices," "unloading trucks," "activating shrink ray," "uploading the bits," "unpacking boxes," "loading the market," "complete!"

In the example of FIG. 11, the graphic says "Peter Postman Says:" and in the speech bubble it says "A Special Delivery just arrived! It includes all new decoration, houses and businesses! Check out the market to see it all . . . " Just below the status bar it says "Unpacking boxes."

Techniques for updating the mobile application may also be deployed upon load of the software application. On load, if an active update is available, the mobile version of the game may display a specific prompt as defined by the game management server. If the application is launched for the first time after installing an update, a reward prompt may be presented if a reward is defined or associated with the update. The previous version installed may be used to determine which update reward should be provided.

Figure 12:
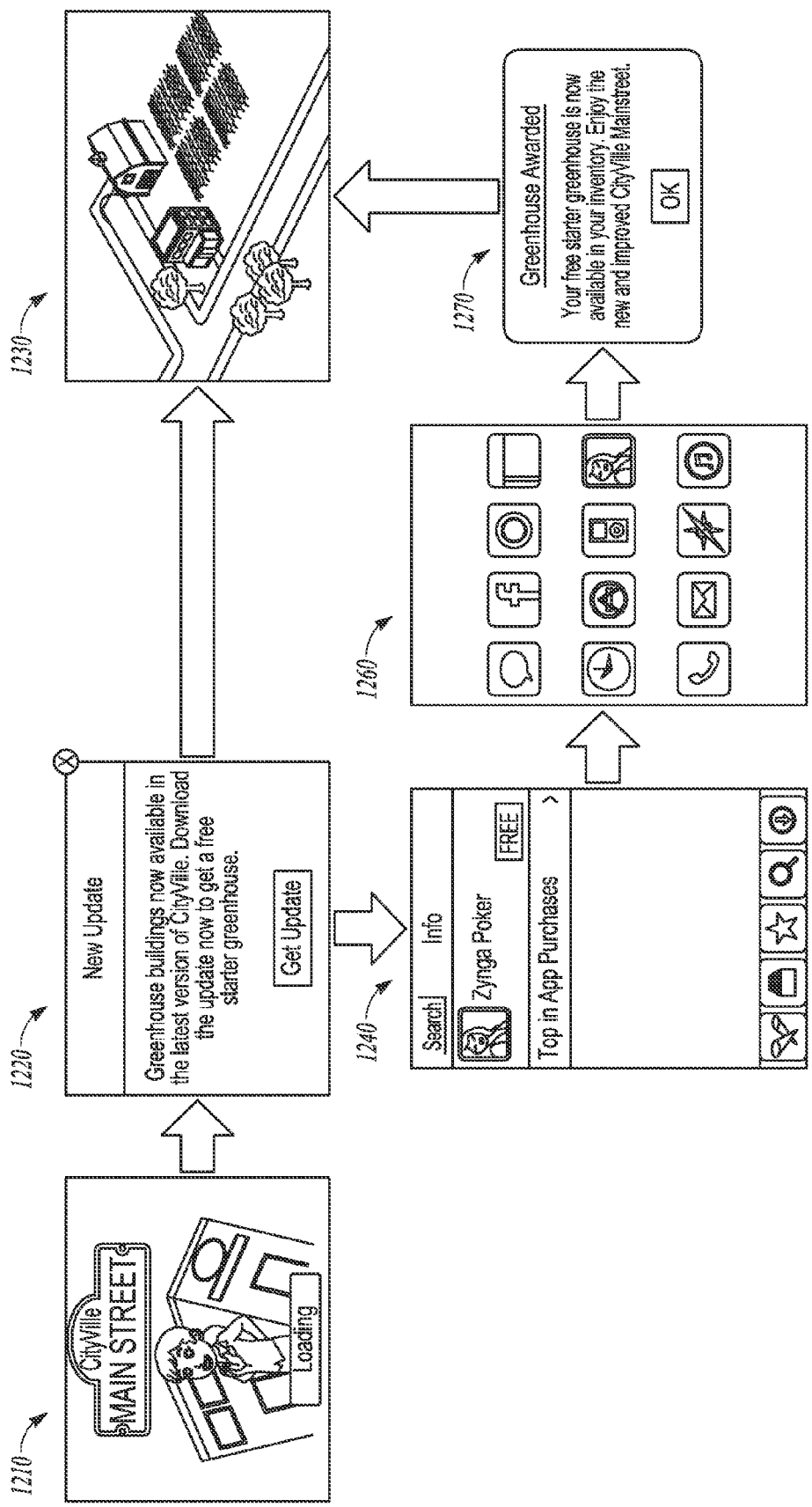
FIG. 12 is an illustration of a flow for providing updates to a mobile version of a game according to one embodiment.

FIG. 12 provides an illustration of an update flow according to one embodiment, providing an update function upon load of the software application on the mobile device. The steps for such an update in some examples may include:

On load of the application, check for active updates that apply to the version at operation 1210.

If update found, display update message at operation 1220. In the example of FIG. 12 the message says "New Update: Greenhouse buildings now available in the latest version of CityVille. Download the update now to get a free starter greenhouse."

If a user closes the optional update message, go into the game without updating at operation 1230.

If a user taps the Get Update button, open the app store or app market to launch the update or obtain the correct version at operation 1240. In some examples, the player may install the update from the app store either through the prompt (e.g., spontaneously), or without viewing the message. Thus even if the update behavior was not motivated by the prompt, the user may achieve the reward.

After update installs, player opens the mobile version of the game at operation 1260.

Player sees reward message if update was incentivized (regardless of whether they saw the update message), then goes into the game after tapping the confirmation button at operation 1270. In the example of FIG. 12, the reward message states "Greenhouse Awarded: Your free starter greenhouse is now available in your inventory. Enjoy the new and improved CityVille Mainstreet."

An embodiment of the mobile game includes features directed to dynamic asset loading and quality swapping, an asset being a game feature or characteristic. E.g., loading high-resolution images on a high-resolution display (such as a Retina screen). Techniques for rendering low high-res assets, e.g., render less quality in flash. The goals for delivery of any updates may include keeping the executable binary that is downloaded to the mobile user below 20 megabytes; delivering high-definition (HD) assets to retina-enabled displays; and keeping the required downloads to short times.

To prevent new players from downloading assets, both non-HD and HD images may be packaged into an initial downloaded binary of the mobile application. The flow for updating with additional assets and content of the mobile application may then operate as follows: A Player downloads and starts to play game. The player plays through the first time user experience. New assets and game content are then patched in from updates in either of these two cases: After the first load after completing the first time user experience; or the first time the player attempts to load another instance of the game (such as by visiting a friend).

Figure 13:
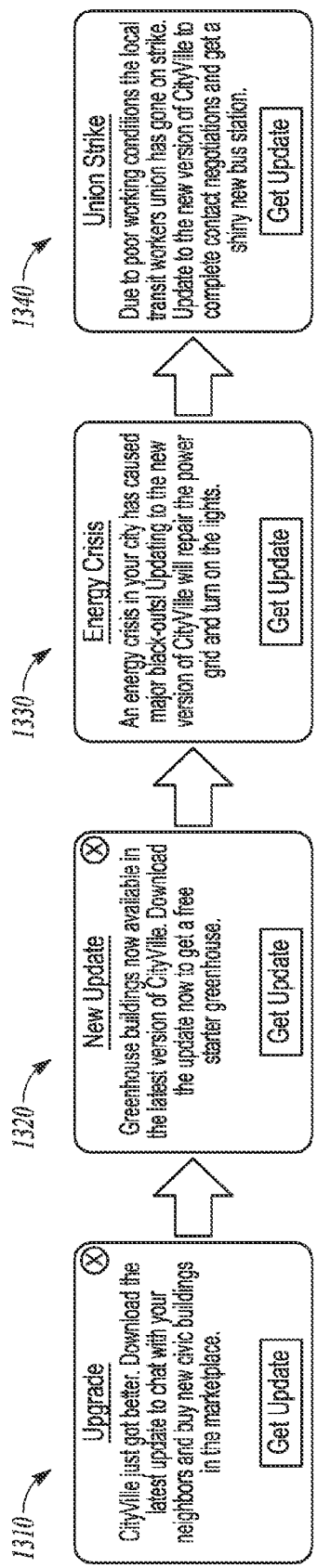
FIG. 13 is an illustration of user interface prompts for providing updates to a mobile version of a game according to one embodiment.

As illustrated in FIG. 13, incentives may be offered to users of the software application in prompts in connection with optional or required updates. The four categories of updates include: Optional—Unincentivized (1310); Optional—incentivized (1320); Required—Unincentivized (1330); and Required Incentivized (1340). In the examples of FIG. 13, the optional unincentivized message states "Upgrade: CityVille just got better. Download the latest update to chat with your neighbors and buy new civic buildings in the marketplace." The Optional—incentivized states "New Update: Greenhouse buildings now available in the latest version of CityVille. Download the update now to get a free starter greenhouse." The Required-Unincentivized states: "Energy Crisis: An energy crisis in your city has caused major black-outs! Updating to the new version of CityVille will repair the power grid and turn on the lights." The Required-Incentivized states "Union Strike: Due to poor working conditions the local transit workers union has gone on strike. Update to the new version of CityVille to complete contract negotiations and get a shiny new bus station."

In one embodiment, the mobile version of the game may also include server-side push new goals to players. This allows the game management system to inform players to perform certain actions or meet certain goals without having to do a content or software update of the mobile version of the game.

In one embodiment, update functionality may also include specific features for providing localization of game text and content for other languages/cultures. The advantage of offering localization information directly is that one binary may be distributed and provided to the user with multiple language support. This enables a single binary or SKU to be distributed for all languages, providing all localization based on user choice.

Localization may be implemented in the mobile version of the game by providing that all text strings within the game are given a unique id, and written as dynamic pieces of sentences that can be loaded. For example, the properties file can be an XML format file that may be downloaded and replaced as necessary.

Mobile Gaming User Interface and Messaging Enhancements

Various improvements may be offered to the user interface mobile version of the game that is customized to game play in a mobile device setting. For example, placement of buttons in the game may correlate to the location of common finger placement of the mobile device. A variety of game play actions and messages may also be hidden in pull-down menus and other status bars that are hidden from view in the mobile device setting.

In another embodiment, the mobile version of the game may provide for use of push notifications in connection with game play and gaming activities. Users typically must opt-in to receiving Push Notifications from the application via a system message. At this point, the user can choose to enable or not enable push notifications. Settings for push notifications may be changed in a website user interface associated with the mobile version of the game.

For example, some of the Notification Types that all games can use may include: a Friend Joined the Game Notification (Whenever a user's social networking friend begins playing the game that the user is playing, a push notification may be provided letting the user know that they joined); Reactivation Notifications—for example, notifications sent to users that have not played in the past 7, 14, 21, 30, and 60 days; Neighbor Invite and Accept Notifications; and Friend Visit Notifications.

Push notification may include marketing messages. For example, marketing messages may be selected by client version, OS version, device version, social networking ID, and the like. For example, a push notification marketing messages may include a notification related to a new update, or a sale or purchase.

Further embodiments of push notifications may be tailored to schedule or display the notifications at certain date and times, to send the push notification at appropriate times based on the user's local time. This may involve obtaining the user's time zone information from the mobile device.

Various users may also receive alternate versions of a Push Notification. Or, users may receive the same Push Notification at alternate times (different times of the day and staggered local times versus Pacific time, for example). Users may also be selected for push notifications on various criterion, such as Payer or non payer; Gaming Level; and Days since last played.

Display of the push notifications may involve using a push notification user interface provided by a mobile device platform or operating system (e.g., use of an Apple iOS push notification user interface). The button action provided by any push notification should be able to open to a specific application screen.

While the above-described embodiments were directed to a specific embodiments of a game application, one skilled in the art with the benefit of this disclosure would understand that the methods and systems disclosed would be applicable to other types of software applications distributed to both mobile and non-mobile settings.

System and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 14:
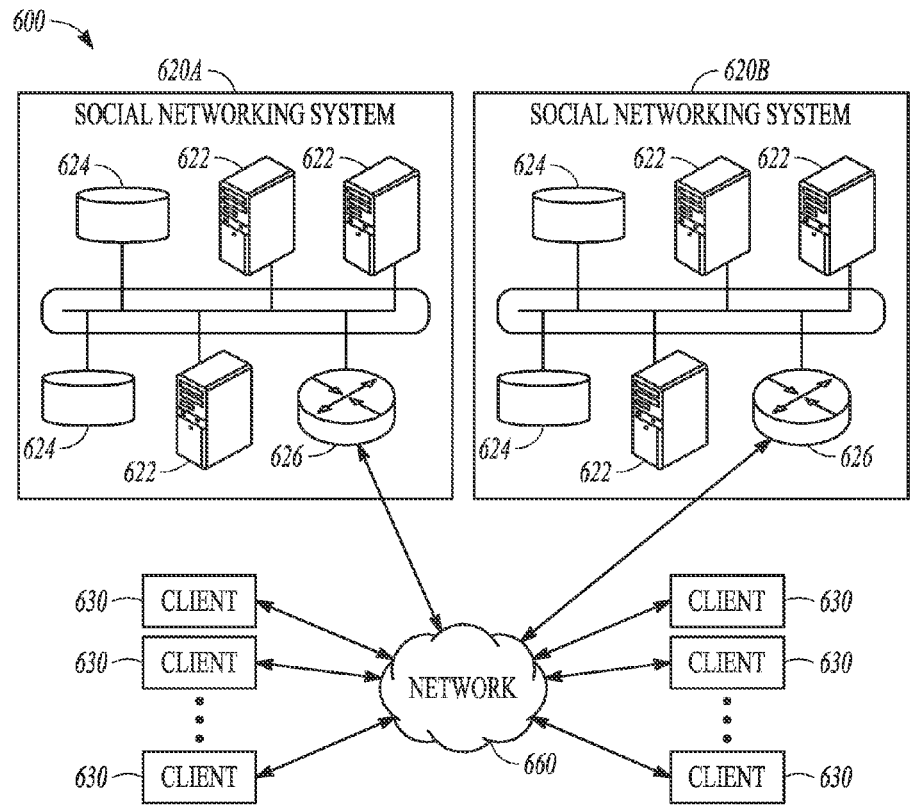
FIG. 14 is a block diagram illustrating an example network environment, in which various example embodiments may operate.
Figure 15:
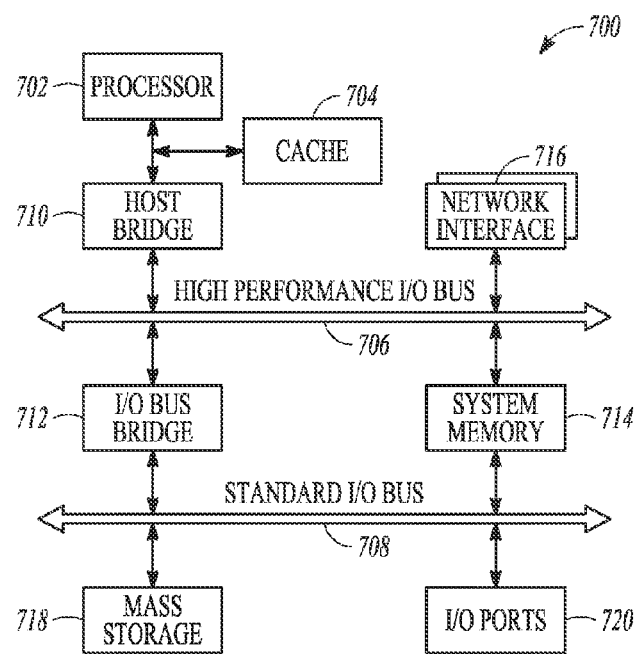
FIG. 15 is a block diagram illustrating an example computing system architecture, which may be used to implement a server or a client system.

Particular embodiments may operate in a wide area network environment, such as the Internet, including multiple network addressable systems. FIG. 14 illustrates an example network environment, in which various example embodiments may operate. Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 14 illustrates, particular embodiments may operate in a network environment comprising one or more networking systems, such as social networking system 620a, game networking system 620b, and one or more client systems 630. The components of social networking system 620a and game networking system 620b operate analogously; as such, hereinafter they may be referred to simply at networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like, In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely)) over a computer network. Client system 630 may be a desktop computer, laptop computer, personal digital assistant (FDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and frequently java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URI, or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment described above and illustrated in FIG. 6 described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

FIG. 14 illustrates an example computing system architecture, which may be used to implement a server 622 or a client system 630. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in servers 422, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein may include or be embodied in logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure. A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses changes, substitutions, variations, alterations, and modifications to the example embodiments herein that a person having ordinary skill in the art would comprehend. For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal assistance, personal gaming device, etc.), that makes API calls directly to a server. Still further, while the embodiments described above may operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure.

What is claimed is:

1. A method of generating graphical output for multi-device computer implemented gaming, the method comprising a plurality of electronic operations performed by processor circuitry of a server computer system, the electronic operations comprising:

generating a first graphical output of a first game instance comprising one or more on-screen objects in a virtual gaming environment, the first graphical output of the first game instance being generated in accordance with a first computer implemented game for output with a non-mobile platform device;

receiving a first electronic indication of a first input received from a user with the first computer implemented game, the first input received with the non-mobile platform device and communicated to the server computer system in the first electronic indication, wherein the first electronic indication is used to indicate that the user has completed a first gameplay specific task in the first game instance;

responsive to processing the first electronic indication of the first input received from the user, updating the first graphical output of the one or more on-screen objects in the first game instance according to one or more game rules defined for the first computer implemented game;

receiving a second electronic indication of a second input received from the user with a second computer implemented game, the second input received at the mobile platform device and communicated to the server computer system in the second electronic indication, wherein the second electronic indication is used to indicate that the user of the second computer implemented game has completed a second gameplay specific task in a second game instance, wherein a second graphical output of the second game instance is generated in accordance with the second computer implemented game for output with the mobile platform device, wherein the mobile platform device operates separately from the non-mobile platform device, and wherein the mobile platform device receives the second input from the user with the mobile platform device to effect the second gameplay specific task; and responsive to processing the second electronic indication of the second input received from the user, updating the first graphical output of the first game instance to display a reward to the user in the first game instance with the non-mobile platform device, wherein the reward is represented by an on-screen virtual game-play object in the virtual gaming environment that is displayed in the first graphical output of the first game instance only as a result of completing the second gameplay specific task in the second graphical output of the second computer implemented game.

2. The method of claim 1, wherein the first computer implemented game is a non-mobile version and the second computer implemented game is a mobile version of a game having a common set of game play rules, the non-mobile version of the game and the mobile version of the game respectively providing the first and second game instances using common objects from at least a portion of the one or more on-screen objects.

3. The method of claim 1, wherein the gameplay specific task is one of: completing a predetermined task in the second computer implemented game or playing the second computer implemented game for more than a predetermined time period.

4. The method of claim 1, wherein the second computer implemented game is the same game as the first computer implemented game, wherein the first computer implemented game is configured for execution on the non-mobile platform device and the second computer implemented game is configured for execution on the mobile platform device.

5. The method of claim 1, wherein providing the reward comprises generating a display of a message on a screen of the non-mobile platform device notifying the user that the reward is available.

6. The method of claim 5, wherein responsive to generating the display of the message on the screen of the non-mobile platform device, the first computer-implemented game generates a display of an input control configured to allow the user to accept the reward.

7. The method of claim 1, wherein the gameplay specific task is a task which is defined by one or more gameplay rules of the second computer implemented game.

8. The method of claim 7, wherein the gameplay specific task includes completion of an accomplishment in the second computer implemented game, the accomplishment defined by one or more gameplay rules unique to the second computer implemented game.

9. A server computing system for generating graphical output for multi-device gaming, comprising:

a display module implemented with processor circuitry of the server computing system, the display module adapted to provide graphical output of a virtual gaming environment of the first computer implemented game with a non-mobile platform device, the display module configured to:

generate a first graphical output of a first game instance comprising one or more on-screen objects in the first game instance in accordance with the first computer implemented game;

an input module implemented with the processor circuitry of the server computing system, the input module adapted to process input of the first computer implemented game received with the non-mobile platform device, the input module configured to:

receive a first electronic indication of a first input from a user with the first computer implemented game, the first input received with the non-mobile platform device and communicated to the server computer system in the first electronic indication, wherein the first electronic indication is used to indicate that the user has completed a first gameplay specific task in the first game instance; and receive a second electronic indication of a second input received from the user with a second computer implemented game, the second input received with a mobile platform device and communicated to the server computer system in the second electronic indication, wherein the second electronic indication is used to indicate that the user of the second computer implemented game has completed a second gameplay specific task in a second game instance wherein a second graphical output of the second game instance is generated in accordance with the second computer implemented game for output with the mobile platform device, wherein the mobile platform device operates separately from the non-mobile platform device, and wherein the mobile platform device receives the second input from the user with the mobile platform device to effect the second gameplay specific task; and a gameplay module implemented with processor circuitry of the server computing system, the gameplay module adapted to effect gameplay of the first computer implemented game with the non-mobile platform device, the gameplay module configured to:

update the first graphical output of the first game instance to display a reward to the user in the first game instance with the non-mobile platform device, responsive to processing the second electronic indication of the second input received from the user, wherein the reward is represented by an on-screen virtual game-play object in the virtual gaming environment that is displayed in the first graphical output of the first game instance only as a result of completing the second gameplay specific task in the second graphical output of the second computer implemented game.

10. The system of claim 9, wherein the first computer implemented game is a non-mobile version and the second computer implemented version of the game is a mobile version of a game having a common set of game play rules, the non-mobile version of the game and the mobile version of the game respectively providing the first and second game instances using common objects from at least a portion of the one or more on-screen objects.

11. The system of claim 9, wherein the gameplay specific task is one of: completing a predetermined task in the second computer implemented game or playing the second computer implemented game for more than a predetermined time period.

12. The system of claim 9, wherein the second computer implemented game is the same game as the first computer implemented game, wherein the first computer implemented game is configured for execution on the non-mobile platform device and the second computer implemented game is configured for execution on the mobile platform device.

13. The system of claim 9, wherein the gameplay module is configured to provide the reward by at least causing the output module to generate a display of a message on a screen of the non-mobile platform device notifying the user that the reward is available.

14. The system of claim 13, wherein the gameplay module is configured to generate a display of an input control configured to allow the user to accept the reward in response to generating the display of the message on the screen of the non-mobile platform device.

15. The system of claim 9, wherein the gameplay specific task is a task which is defined by one or more gameplay rules of the second computer implemented game.

16. The system of claim 15, wherein the gameplay specific task includes completion of an accomplishment in the second computer implemented game, the accomplishment defined by one or more gameplay rules unique to the second computer implemented game.

17. A non-transitory machine readable medium that stores instructions which when performed by a server computing machine, cause the server computing machine to perform operations comprising:

generating a first graphical output of a first game instance comprising one or more on-screen objects in a virtual gaming environment, the first graphical output of the first game instance being generated in accordance with a first computer implemented game for output with a non-mobile platform device;

receiving a first electronic indication of a first input received from a user with the first computer implemented game, the first input received with the non-mobile platform device and communicated to the server computer system in the first electronic indication, wherein the first electronic indication is used to indicate that the user has completed a first gameplay specific task in the first game instance;

responsive to processing the first electronic indication of the first input received from the user, updating the first graphical output of the one or more on-screen objects in the first game instance according to one or more game rules defined for the first computer implemented game;

receiving a second electronic indication of a second input received from the user with a second computer implemented game, the second input received with a mobile platform device and communicated to the server computer system in the second electronic indication, wherein the second electronic indication is used to indicate that the user of the second computer implemented game has completed a second gameplay specific task in a second game instance, wherein a second graphical output of the second game instance is generated in accordance with the second computer implemented game for output with the mobile platform device, wherein the mobile platform device operates separately from the non-mobile platform device, and wherein the mobile platform device receives the second input from the user with the mobile platform device to effect the second gameplay specific task; and responsive to processing the second electronic indication of the second input received from the user, updating the first graphical output of the first game instance to display a reward to the user in the first game instance with the non-mobile platform device, wherein the reward is represented by an on-screen virtual game-play object in the virtual gaming environment that is displayed in the first graphical output of the first game instance only as a result of completing the second gameplay specific task in the second graphical output of the second computer implemented game.

18. The machine-readable medium of claim 17, wherein the first computer implemented game is a non-mobile version and the second computer implemented version of the game is a mobile version of a game having a common set of game play rules, the non-mobile version of the game and the mobile version of the game respectively providing the first and second game instances using common objects from at least a portion of the one or more on-screen objects.

19. The machine-readable medium of claim 17, wherein the gameplay specific task is one of: completing a predetermined task in the second computer implemented game or playing the second computer implemented game for more than a predetermined time period.

20. The machine-readable medium of claim 17, wherein the second computer implemented game is the same game as the first computer implemented game, wherein the first computer implemented game is configured for execution on the non-mobile platform device and the second computer implemented game is configured for execution on the mobile platform device.

21. The machine-readable medium of claim 17, wherein the instructions for providing the reward comprises instructions, which when executed by the machine, cause the machine to: generate a display of a message on a screen of the non-mobile platform device notifying the user that the reward is available.

22. The machine-readable medium of claim 21, wherein the instructions which when performed by the machine, further cause the machine to perform operations to: generate a display of an input control configured to allow the user to accept the reward responsive to generating the display of the message on the screen of the non-mobile platform device.

23. The machine-readable medium of claim 17, wherein the gameplay specific task is a task which is defined by one or more gameplay rules of the second computer implemented game.

24. The machine-readable medium of claim 23, wherein the gameplay specific task includes completion of an accomplishment in the second computer implemented game, the accomplishment defined by one or more gameplay rules unique to the second computer implemented game.

25. The method of claim 1, wherein both of the first computer implemented game and the second computer implemented game utilize one or more common rules from at least a portion of the one or more game rules.

* * * * *